United States Patent
Vandeweerd et al.

(10) Patent No.: US 10,019,639 B2
(45) Date of Patent: Jul. 10, 2018

(54) DETERMINING A BOUNDARY ASSOCIATED WITH IMAGE DATA

(71) Applicant: BLACKBERRY LIMITED, Waterloo (CA)

(72) Inventors: Sean Vandeweerd, Etobicoke (CA); Sanjay Nathwani, Mississauga (CA); Kian Marandi, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 162 days.

(21) Appl. No.: 15/132,572

(22) Filed: Apr. 19, 2016

(65) Prior Publication Data

US 2017/0300769 A1    Oct. 19, 2017

(51) Int. Cl.
| | |
|---|---|
| G06K 9/00 | (2006.01) |
| G06K 9/32 | (2006.01) |
| H04N 5/232 | (2006.01) |
| G06K 19/06 | (2006.01) |
| G06T 1/00 | (2006.01) |
| H04N 1/32 | (2006.01) |

(52) U.S. Cl.
CPC ......... *G06K 9/3233* (2013.01); *G06K 9/3216* (2013.01); *G06K 19/06028* (2013.01); *G06T 1/0021* (2013.01); *G06T 1/0085* (2013.01); *H04N 1/32277* (2013.01); *H04N 1/32352* (2013.01); *H04N 5/23293* (2013.01); *H04N 5/23296* (2013.01)

(58) Field of Classification Search
CPC .......... G06K 9/3233; G06T 2201/0052; G06T 2201/0061; G06T 2201/0065; G06T 2201/0081

USPC ......................................................... 382/100
See application file for complete search history.

(56) References Cited

U.S. PATENT DOCUMENTS

| | | | |
|---|---|---|---|
| 7,222,235 B1 | 5/2007 | Mitsui et al. | |
| 7,346,185 B2 | 3/2008 | Grossman et al. | |
| 9,022,292 B1 | 5/2015 | Van Der Merwe et al. | |
| 9,607,131 B2 | 3/2017 | Winograd et al. | |
| 2001/0012019 A1 | 8/2001 | Yamazaki et al. | |
| 2002/0031246 A1* | 3/2002 | Kawano ................. | G06T 5/008 |
| | | | 382/132 |
| 2003/0223614 A1 | 12/2003 | Robins et al. | |

(Continued)

FOREIGN PATENT DOCUMENTS

| | | |
|---|---|---|
| EP | 1253555 A2 | 10/2002 |
| JP | H07 121293 | 5/1995 |

OTHER PUBLICATIONS

EPO, Extended European Search Report relating to EP application No. 17161332.6 dated Jul. 10, 2017.

(Continued)

*Primary Examiner* — Van D Huynh
(74) *Attorney, Agent, or Firm* — Rowand LLP

(57) ABSTRACT

A method and device for determining a boundary associated with image data captured by an electronic device is provided. The electronic device may include a camera. In one aspect, a method includes: capturing the image data using the camera; based on the captured image data, detecting a boundary marker displayed by a display device, the boundary marker is periodically displayed to be undetectable by a human eye that is viewing the display device; and modifying, based on the boundary marker, image data captured by the camera.

17 Claims, 12 Drawing Sheets

(56) References Cited

U.S. PATENT DOCUMENTS

| | | |
|---|---|---|
| 2004/0184612 A1 | 9/2004 | Kohiyama et al. |
| 2006/0086796 A1 | 4/2006 | Onogi et al. |
| 2006/0239503 A1 | 10/2006 | Petrovic et al. |
| 2008/0089552 A1 | 4/2008 | Nakamura et al. |
| 2009/0226101 A1 | 9/2009 | Lessing |
| 2010/0067692 A1 | 3/2010 | Schultz |
| 2010/0228632 A1* | 9/2010 | Rodriguez .............. G06F 3/011 705/14.66 |
| 2011/0128384 A1 | 6/2011 | Tiscareno et al. |
| 2011/0216207 A1 | 9/2011 | Kazama |
| 2012/0072731 A1 | 3/2012 | Winograd et al. |
| 2012/0260307 A1 | 10/2012 | Sambamurthy et al. |
| 2014/0003653 A1* | 1/2014 | Walker ................. G06K 9/3216 382/103 |
| 2015/0023669 A1* | 1/2015 | Jiang ................... H04B 10/116 398/118 |
| 2016/0104408 A1 | 4/2016 | Kim et al. |
| 2016/0253508 A1 | 9/2016 | Song et al. |
| 2016/0357947 A1 | 12/2016 | Cohen et al. |

OTHER PUBLICATIONS

Carpenter, John, "They Live", youtube, May 10, 2013, p. 2, pp., XP054977474, Retrieved from the Internet: URL: https://www.youtube.com/watch?v=QVgl1HOxpj8 [retrieved on Jun. 23, 2017], p. 1-p. 2.

EPO, Extended European Search Report relating to EP application No. 17161289.8 dated Jul. 26, 2017.

USPTO, Office Action relating to U.S. Appl. No. 15/132,606 dated Sep. 29, 2017.

\* cited by examiner

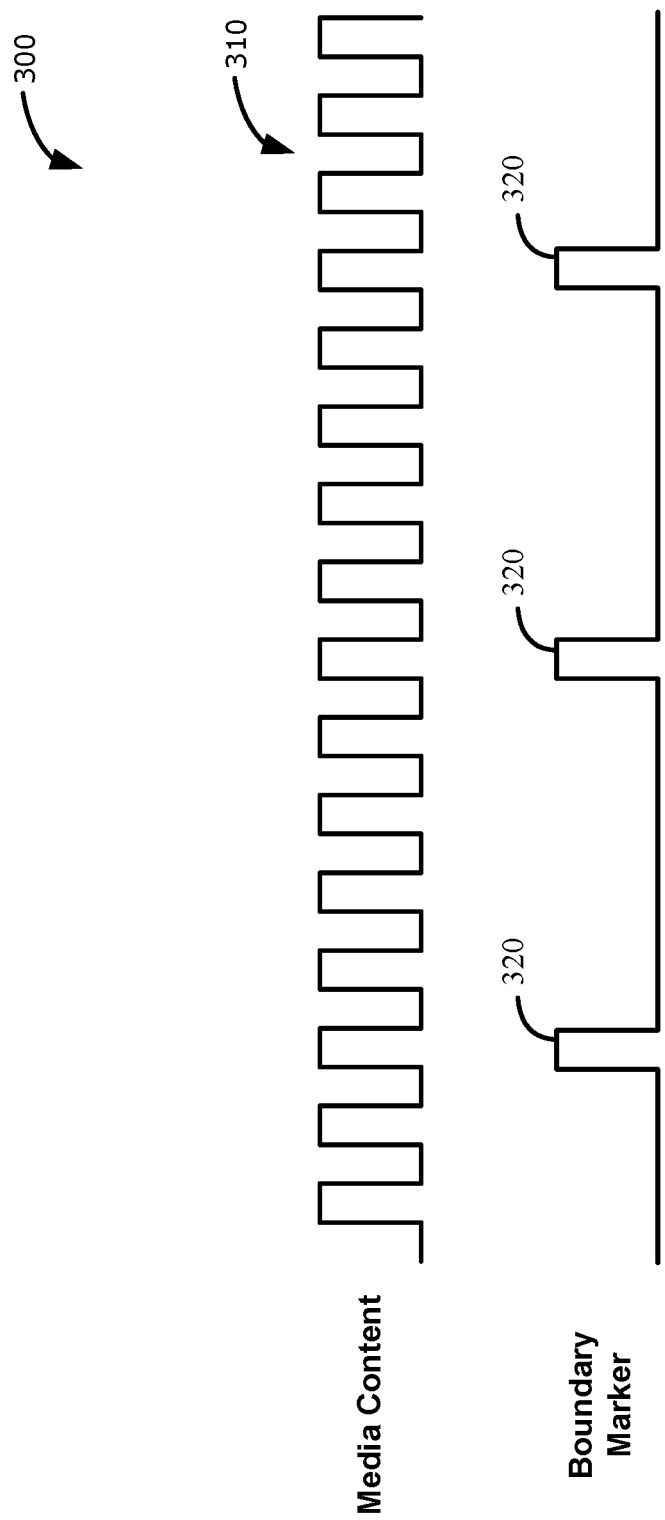

DETERMINING A BOUNDARY ASSOCIATED WITH IMAGE DATA

The present disclosure relates generally to electronic devices having cameras and, more particularly, to methods and devices for capturing image data using the electronic device.

BACKGROUND

Electronic devices having cameras are often equipped with at least one image sensor. The electronic device may capture image data by detecting light incident on an image sensor and converting the detected light into electrical signals. Generally, the frame rate of an image sensor is a measure of how many times a full pixel array of an image sensor may be read in a given amount of time. A captured image frame may include image data representing light incident on a full pixel array on an image sensor. However, a single image frame may not include additional information for subsequent handling of the captured image data.

BRIEF DESCRIPTION OF THE DRAWINGS

Reference will now be made, by way of example, to the accompanying drawings which show example embodiments of the present application, and in which:

FIG. 3 is an illustration of a sequence diagram for providing media content and a boundary marker by a display device in accordance with example embodiments of the present disclosure;

Like reference numerals are used in the drawings to denote like elements and features.

DETAILED DESCRIPTION OF EXAMPLE EMBODIMENTS

In one example aspect, the present disclosure describes a method of determining a boundary associated with image data captured by an electronic device. The method includes capturing the image data using the electronic device. Based on the captured image data, the method includes detecting a boundary marker displayed by a display device. The boundary marker is periodically displayed to be undetectable by a human eye that is viewing the display device. Based on the boundary marker, the method also includes modifying the image data captured by the electronic device.

In another aspect, an electronic device is described. The electronic device includes a camera and a memory device. The electronic device also includes a processor coupled to the camera and the memory device. The processor may be configured to capture image data using the camera. Based on the captured image data, the processor may be configured to detect a boundary marker displayed by a display device. The boundary marker may be periodically displayed to be undetectable by a human eye that is viewing the display device. Based on the boundary marker, the processor may be configured to modify the image data captured by the electronic device.

In yet a further aspect, a non-transitory computer-readable storage medium comprising processor-executable instructions is described. The instructions, when executed by a processor of the electronic device, cause the processor of the electronic device to capture image data using the camera. Based on the captured image data, the instructions cause the processor to detect a boundary marker displayed by a display device. The boundary marker may be periodically displayed to be undetectable by a human eye that is viewing the display device. Based on the boundary marker, the instructions cause the processor to modify the image data captured by the electronic device.

In yet a further aspect, the present disclosure describes non-transitory computer-readable media storing computer-executable program instructions which, when executed, configure a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination or all of the elements, and without necessarily excluding additional elements.

In the present application, the term "a processor" is intended to include both a single processor and also a plurality of processors coupled to one another which distribute operations among the processors.

Figure 1:
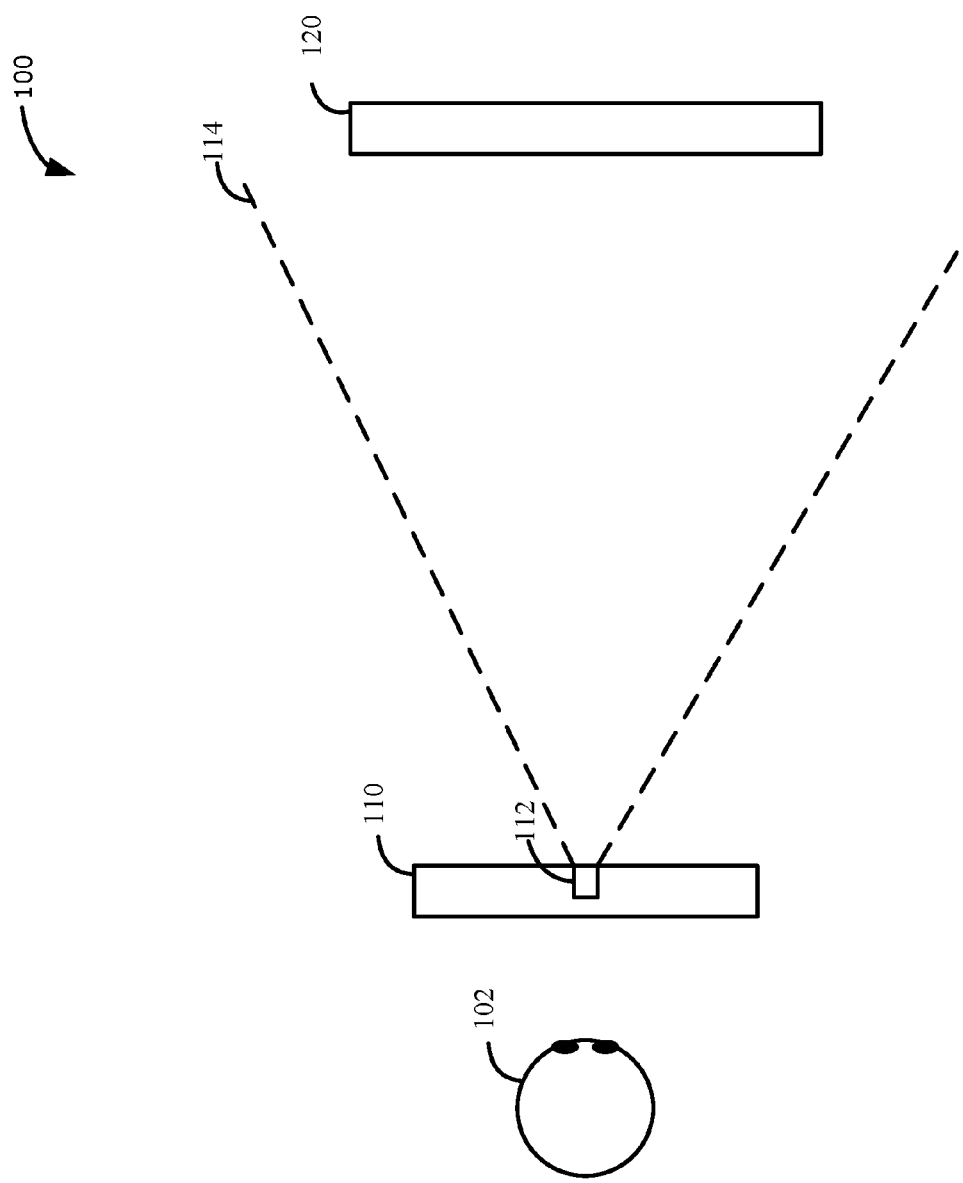
FIG. 1 is a schematic illustration of an electronic device capturing image data in accordance with example embodiments of the present disclosure.

Reference is now made to FIG. 1, which is a schematic illustration of an electronic device 110 capturing image data. An environment 100 is illustrated where an electronic device 110 is being operated by a user 102. The electronic device 110 may be any suitable electronic device that may be held and operated by the user 102 in order to interact with the environment 100.

In some embodiments, the electronic device 110 may include a camera 112 that is capable of capturing image data, such as images, in the form of still photo and/or motion data. The electronic device 110 may be used to observe the environment 100 within a field of view 114. The field of view 114 may be a scene that is observed from the perspective of the electronic device 110 through the camera 112. The electronic device 110 may generate image data in the form of electronic signals produced by an image sensor (not shown) associated with the camera 112. In some embodiments, the camera may have a lens for focusing a scene or object being photographed onto the image sensor.

In some embodiments, the electronic device 110 may be used to observe the environment within a field of view 114. The field of view 114 may include one or more display devices 120. That is, the electronic device 110 may observe content displayed on the display device 120 that is within the field of view 114.

Although the electronic device 110 is illustrated as being operated adjacent a viewing surface of a display device 120, in some embodiments, the electronic device 110 may be operated in any other position relative to the viewing surface of the display device 120. For example, the electronic device 110 may be operated such that the field of view 114 of the camera 112 originates from an off-center position relative the viewing surface of the display device 120.

In some embodiments, the electronic device 110 may alter the breadth of the field of view 114. In some embodiments, the electronic device 110 may be positioned at various distances from the display device 120. For example, a user 102 may operate the electronic device 110 and may physically position the electronic device 110 to be nearer or farther away from the display device 120. When the display device 120 is within the field of view 114, the displayed contents of the display device 120 may occupy a portion of a captured image. In some embodiments, when the electronic device 110 is nearer to the display device 120, the contents of the display device 120 may occupy a larger portion of the captured image. When the electronic device 110 is further away from the display device 120, the contents of the display device 120 may occupy a smaller portion of the captured image.

In some embodiments, the electronic device 110 may alter the breadth of the field of view 114 by adjusting a camera lens position. A camera lens may focus a scene or object onto an image sensor of a camera 112. For example, the electronic device 110 may adjust a camera lens position to provide optical zoom. Accordingly, the display contents of the display device 120 may occupy a larger portion of the captured image. Alternatively, the electronic device 110 may also adjust a camera lens position to provide a wider field of view. Correspondingly, the display contents of the display device 120 may occupy a smaller portion of the captured image.

In some embodiments, the electronic device 110 may be a mobile communication device and the electronic device 110 may be portable and easily moved from one physical location to a different physical location. In some embodiments, the electronic device 110 may be configured to be positioned in a fixed location and may be configured to alter a field of view 114 by adjusting a camera lens position.

In some embodiments, the electronic device 110 may be a multi-mode communication device configured for data and/or voice communication, such as a smartphone. In some embodiments, the electronic device 110 may be a wearable computer, such as a virtual reality apparatus enabling a user 102 to interact with the environment 100, wearable camera lenses, or similar type devices. In some embodiments, the electronic device 110 may be a tablet computer, a personal digital assistant (PDA), or any other computer system that may be operable by a user. The electronic device 110 may take other forms apart from those specifically listed above.

In some embodiments, the display device 120 may show a series of images at a high frequency. For example, the display device 120 may be an liquid crystal display (LCD), light-emitting diode (LED) display, a cathode-ray tube (CRT) display, organic light-emitting diode (OLED) display, or any other display technology capable of showing a series of images to a user 102. The display device 120 may display a series of images at a fixed frequency or a variable frequency. In some embodiments, the frequency at which a series of images is displayed may be referred to as a refresh rate of the display device 120.

In some embodiments, the display device 120 may be a television. For example, a television may receive signals being broadcast by a television network provider and may process received signals and display the signals on a television screen. In some embodiments, the display device 120 may be a computer monitor or a computer laptop screen. In some embodiments, the display device 120 may be a display screen of another electronic device 110.

Figure 2:
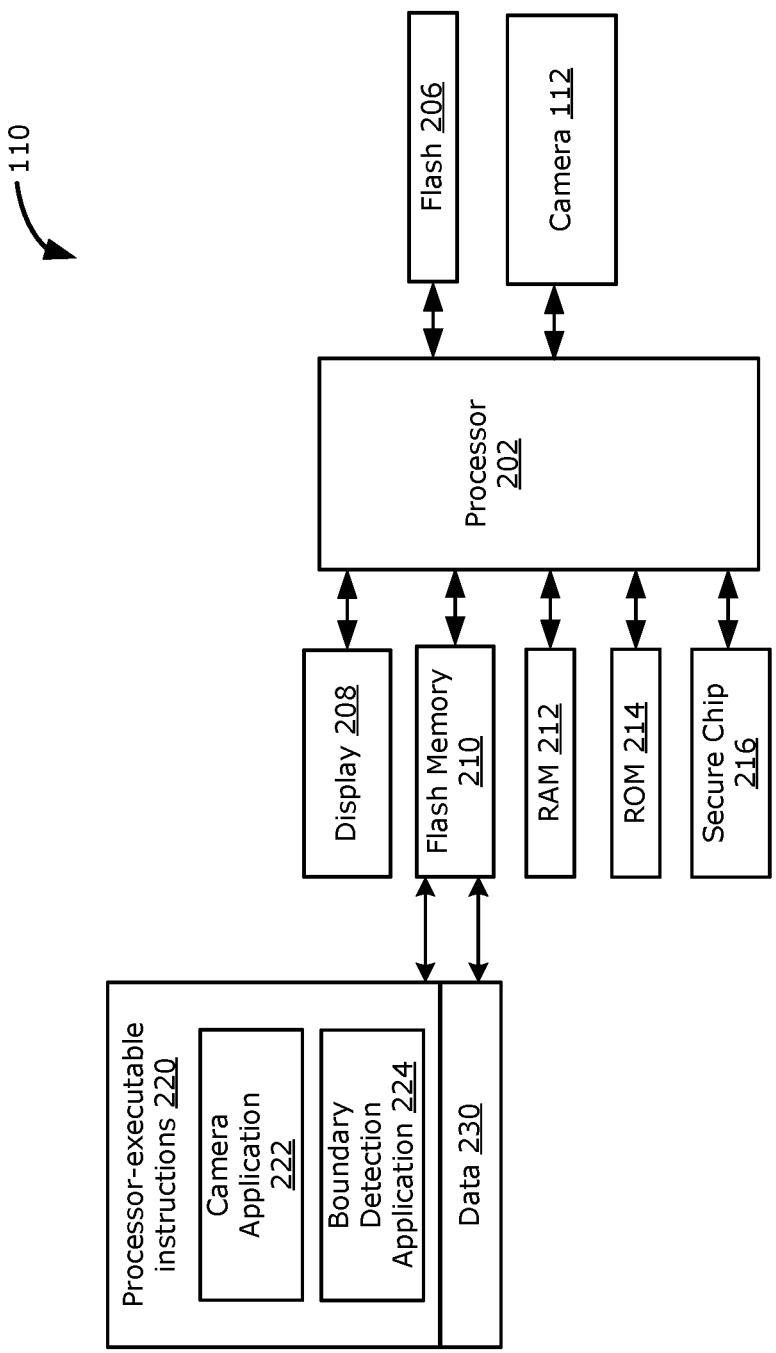
FIG. 2 is a block diagram illustrating an example electronic device in accordance with example embodiments of the present disclosure.

Reference is now made to FIG. 2, which is a block diagram illustrating an example electronic device 110. The electronic device includes a controller including at least one processor 202 (such as a microprocessor) which controls the overall operation of the electronic device 110. The processor 202 may be communicatively coupled to device subsystems such as one or more output interfaces (such as a display 208, a flash 206 and/or a speaker (not shown)), one or more input interfaces (such as a camera 112, control buttons (not shown), a touch-sensitive overlay (not shown) associated with a touchscreen display and/or other input interfaces), and memory (such as flash memory 210, random access memory (RAM) 212, read only memory (ROM) 214, secure chip 216, etc.).

In some embodiments, the display 208 may function as a viewfinder. For example, when a camera 112 of the electronic device 110 is active, the display 208 may provide a preview of a field of view 114 as seen from the perspective of the camera 112. In some embodiments, the display 208 may be used to provide a user 102 with a preview of captured images or images that have been stored in any of the memory devices.

The electronic device 110 may include a camera 112 capable of capturing image data, such as images, in the form of still photo and/or motion data. The image data may be generated in the form of an electronic signal which is produced by an image sensor associated with the camera 112. For example, in some embodiments, the image sensor associated with the camera 112 may be a complementary metal-oxide-semiconductor (CMOS) sensor. In other embodiments, the image sensor associated with the camera 112 may be a charge-coupled device (CCD) sensor. In some embodiments, an adjustable camera lens may focus a scene or object onto the image sensor to capture imaged content.

In some embodiments, the frame rate of an image sensor is the measure of how many times a full pixel array can be read in a given period of time. For example, the given period of time may be one second. For example, image sensors may have a frame rate of 24 to 30 frames per second.

In some embodiments, the image sensor associated with the camera 112 may be unable to capture a full image or retrieve image data from the full pixel array of the image sensor at one exact point in time. Accordingly, in some embodiments, an image sensor may progressively scan a scene (e.g., top to bottom or side to side) to retrieve a captured image. For example, the image sensors may capture image data including multiple image frames and generate a full image based on the multiple image frames. That is, each of the multiple image frames may contain a portion of the full image and the processor 202 may generate a full image based on the multiple image frames. In some embodiments, the image sensor associated with the camera 112 may capture a full image or retrieve image data from the full pixel array of the image sensor at one exact point in time.

The electronic device 110 may store data 230 in an erasable persistent memory, which in one example is the flash memory 210. In some embodiments, the data 230 includes image data generated by the camera 112.

The processor 202 may operate under stored program control and executes processor-executable instructions 220 stored in memory such as persistent memory, for example, in the flash memory 210. The processor-executable instructions 220 or parts thereof may be temporarily loaded into volatile memory such as the RAM 212. The RAM 212 may be used for storing runtime data variables and other types of data or information. Although specific functions are described for various types of memory, this is merely one example. It will be appreciated that a different assignment of functions to types of memory could also be used.

The processor 202 may be communicatively coupled to the camera 112 to allow the processor 202 to receive electronic signals representing image data from the camera 112. The processor 202 may also be communicatively coupled to the flash 206 to allow the processor 202 to control the flash 206.

In some embodiments, the processor-executable instructions 220 may include one or more camera applications 222 or software modules which are configured to control the camera 112 and the flash 206. The camera application 222 may, for example, be configured to provide a viewfinder on the display 208 by displaying, in real time or near real time, images defined in the electronic signals received from the camera 112. The camera application 222 may be configured to store the images or videos to memory, for example the flash memory 210. The images or image frames may be stored in various formats including JPEG, RAW, bitmap image file (BMP), etc. The camera application 222 may be configured to receive data from one or more image sensors of the camera 112.

The camera application 222 may, in various embodiments, determine and/or control any one or more of a number of camera related features, options or settings including, for example, the flash 206, a digital zoom feature (which may crop an image to a centered area with the same aspect ratio as the original), an image stabilization feature, a shutter speed, a camera lens aperture, a focal length, high dynamic range settings such as a long exposure time and a short exposure time, a white balance setting and other camera configuration settings. In some embodiments, the focal length may be adjusted by lens movement. Lens movement contributes to focusing a scene or object onto an image sensor. At least some of the features may be automatically determined by the camera application 222. That is, at least some of the above mentioned settings may be determined without direct user input setting such settings.

While the example discussed above includes a processor 202 coupled with a camera application 222 which collectively act as an image signal processor to provide image related functions, in some other embodiments (not shown), another processor, such as a dedicated image signal processor, may provide some or all of these functions. That is, an image signal processor may be configured to perform the functions of the camera application 222 or a portion thereof.

For example, the camera 112 may be a digital camera provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as a Serial Peripheral Interface (SPI) or Inter-Integrated Circuit (I2C) interface for connecting to a printed circuit board (PCB) of the electronic device 110. The controller provided on the IC may be configured to perform some or all of the features of the methods described herein.

While the camera application 222 has been illustrated as a stand-alone application, in at least some embodiments, the functions of the camera application 222 may be provided by a plurality of software modules.

In some embodiments, functions of the camera 112 may be provided by applications separate from or in addition to the camera application 222. For example, a boundary detection application 224 may, in various embodiments, detect boundary markers and identify boundaries associated with image data captured by an electronic device 110. That is, the processor 202 may be coupled with a boundary detection application 224 which collectively act as an image signal processor to perform some or all of the features of the methods described herein.

Further, while the memory which stores processor-executable instructions 220 has been illustrated using a block that is separate from the processor 202, in practice, the memory storing the processor-executable instructions 220 may be provided on-board the processor 202. That is, the processor 202 may include internal memory and the processor-executable instructions 220 may be provided on the internal memory.

In some embodiments, the electronic device 110 may include a secure chip 216. The secure memory chip may be a memory chip that may not be written to by standard processor-executable instructions 220. That is, the secure memory chip may include information that is unique to the electronic device 110 and that may have been written to the secure chip 216 at the time that the electronic device 110 was manufactured. For example, the secure chip 216 may store information for authenticating the electronic device 110. In another example, the secure chip 216 may store identifying information about the electronic device 110.

The electronic device 110 may include other components apart from those illustrated in FIG. 2. By way of example, the electronic device 110 may include or is connectable to a power sources such as a battery. The battery may be one or more rechargeable batteries that may be charged, for example, through charging circuitry coupled to a battery interface. The battery may provide electrical power to at least some of the electrical circuitry in the electronic device, and the battery interface may provide a mechanical and electrical connection for the battery. The battery interface may be coupled to a regulator which provides power V+ to the circuitry of the electronic device 110.

Reference is now made to FIG. 3, which is an illustration of a sequence diagram 300 for providing media content and one or more boundary markers by a display device 120. For example, FIG. 3 illustrates an example of a stream of media content frames 310 that may be overlaid with boundary marker frames 320. Each media content frame in the stream of media content frames 310 may be provided or displayed by the display device 120 at a first frequency. For example, the first frequency may be a refresh rate of the display device 120. Further, the boundary marker frames 320 may be provided or displayed by the display device 120 at a second frequency. In some embodiments, the first frequency may be greater than the second frequency such that a select number of media content frames 310 may be overlaid with boundary marker frames 320. In some embodiments, the boundary marker frames 320 may be embedded or incorporated into the media content frames 310 themselves.

As described above, the frequency at which the boundary marker frames 320 are provided may be less than the frequency at which the media content frames 310 are provided such that the periodically displayed boundary marker frames 320 are undetectable by a human eye viewing the display device 120. That is, the boundary marker frames 320 may be interleaved into media content frames 310 being displayed by the display device 120 at a refresh rate frequency, such as the first frequency.

In some embodiments, while the boundary marker frames 320 may be interleaved into media content frames 310 such that the boundary marker frames 320 may be undetectable by an unaided human eye viewing the display device 120, the boundary marker frames 320 may be detectable by an image sensor associated with a camera 112 of the electronic device 110. In some embodiments, periodically displayed boundary marker frames 320 may be used to provide boundary related information according to methods and devices described herein.

Based on the media content frames 310 and the boundary marker frames 320 discussed above, a display device 120 may be able to convey information to an electronic device 110 through a mechanism that is undetectable or imperceptible to an unaided human eye. That is, a user 102 may not be able to detect information being conveyed by the boundary marker frames 320 without the use of the electronic device 110.

Reference is now made to FIGS. 4A, 4B, 4C, and 4D, which illustrate example captured images 450 associated with a field of view 114 as seen by an electronic device 110. For example, captured image 450 may be based on image data detected by an image sensor of a camera 112.

In some embodiments, one or more display devices 120 may have display surfaces 410a, 410b, 410c, 410d. For ease of explanation, the display surfaces 410a, 410b, 410c, 410d may generally be described as the display surfaces 410.

As illustrated in FIGS. 4A, 4B, 4C, 4D, in some embodiments, the display surface 410 of a display device 120 may be situated within a portion of the field of view 114 as seen from the perspective of an electronic device 110. The user 102 may operate the electronic device 110 at various distances from the display device 120. Based on the distance between the electronic device 110 and the display device 120, the display surface 410 of the display device may occupy a different portion of the field of view 114. For example, when the electronic device 110 is nearer to the display device 120, the contents of the display device 120 may occupy a larger portion of the captured image 450. When the electronic device 110 is further away from the display device 120, the contents of the display device 120 may occupy a smaller portion of the captured image 450.

Figure 4B:
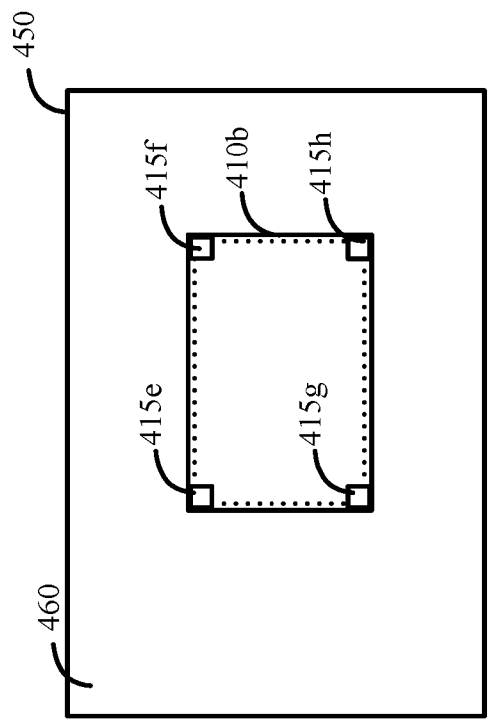
FIGS. 4A, 4B, 4C, and 4D are illustrations of captured images based on fields of view as viewed by an electronic device in accordance with example embodiments of the present disclosure.
Figure 4A:
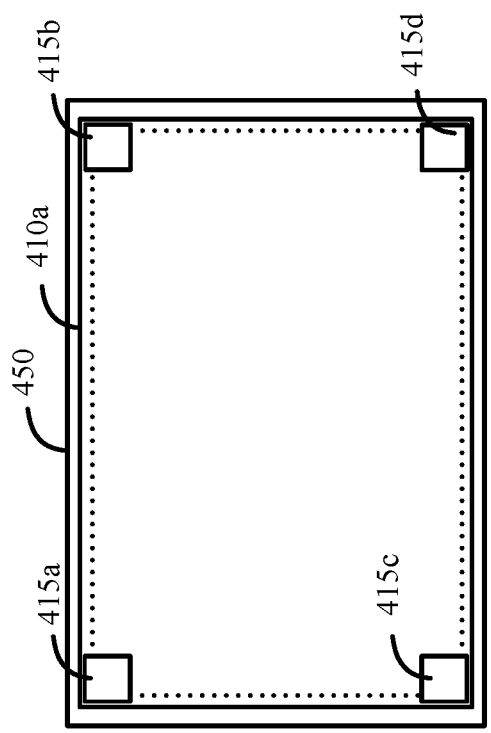

Referring to FIG. 4A, an example captured image 450 is shown when content displayed on a display surface 410a occupies a substantial portion of the field of view 114. That is, the electronic device 110 may be positioned sufficiently near the display device 120 such that the display surface 410a occupies the entire field of view 114. When the field of view 114 is occupied by the display surface 410a, the captured image 450 may include the content being displayed on the display surface 410a.

In some embodiments, the display surface 410 may occupy a less than full portion of the captured image 450. Referring to FIG. 4B, an example captured image 450 is shown when the display surface 410b occupies less than a full portion of the field of view 114 of an electronic device 110. For example, compared to FIG. 4A, in FIG. 4B, the electronic device 110 may be positioned further away from the display device 120 such that the field of view 114 of the electronic device 110 may include a background scene 460 and the display surface 410b.

In another example, compared to FIG. 4A, in FIG. 4B, the electronic device 110 may be configured to adjust focal length settings by re-positioning a lens of the camera 112. Adjusting the focal length setting of the camera 112 may alter the field of view 114 of the camera 112 such that the field of view 114 may include a background scene 460 and the display surface 410b. For ease of illustration, the background scene 460 is illustrated as a plain background.

Figure 4C:
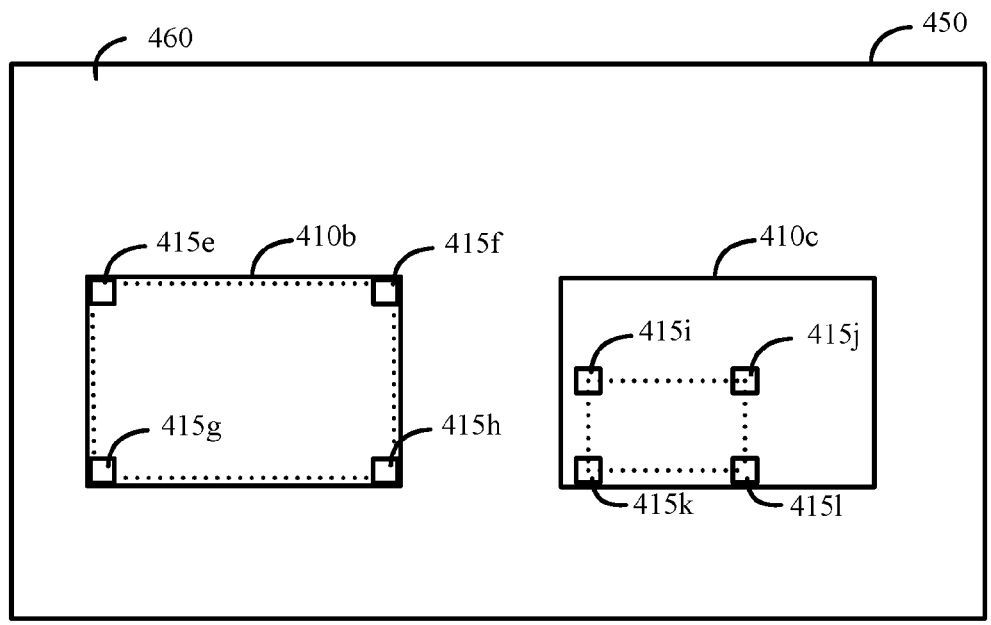

In some embodiments, content from two or more display surfaces 410 may occupy portions of the captured image 450. Referring to FIG. 4C, an example captured image 450 is shown when two distinct display devices 120 may occupy the field of view 114 of the electronic device 110. For example, similar to the environment of FIG. 4B, the electronic device 110 may be positioned away from display devices 120 such that the field of view 114 of the electronic device 110 may include a first display surface 410b from a first display device 120, a second display surface 410c from a second display device 120, and a background scene 460. When the field of view 114 is occupied by the first display surface 410b, the second display surface 410c and the background scene 460, the captured image 450 at the electronic device 110 may include contents displayed on the first and second display surfaces 410b, 410c and the background scene 460.

Figure 4D:
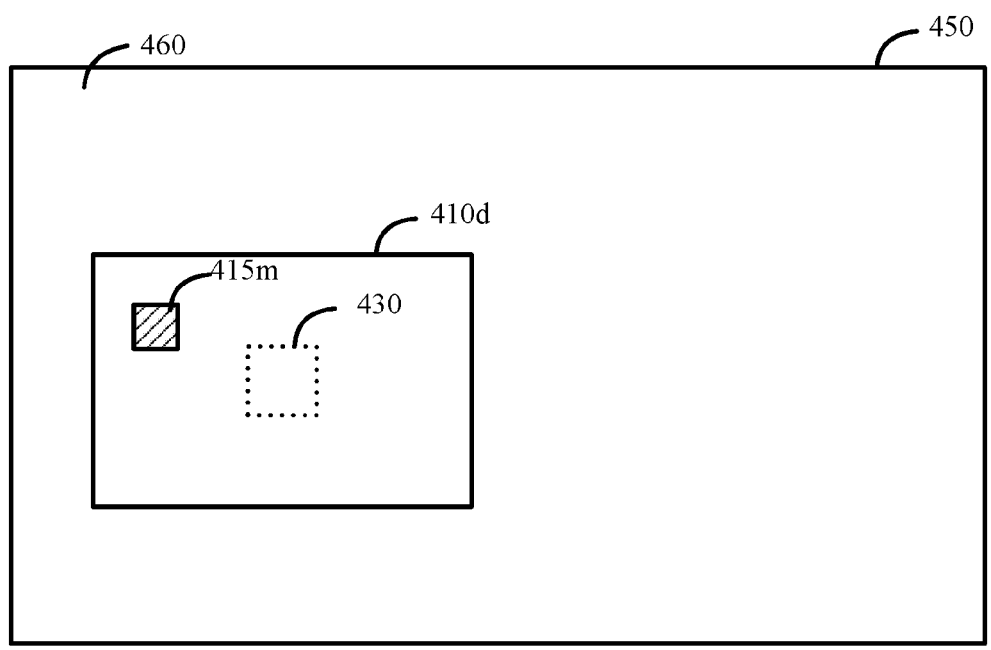

Referring to FIG. 4D, similar to FIGS. 4B and 4C, a display surface 410d of a display device 120 may occupy a less than full portion of a captured image 450.

As illustrated by FIGS. 4A, 4B, 4C, and 4D, a captured image 450 may include one or more boundary markers 415a to 415m. For ease of explanation, the boundary markers 415a to 415m may generally be described as boundary markers 415. As described with reference to FIG. 3, the one or more boundary markers 415 may be periodically provided by boundary marker frames 320.

In some embodiments, boundary markers 415 may be a distinct shape discernible from contents being displayed by a display device 120. For example, boundary markers 415 may be a distinct shape with a colour distinguishable from contents being displayed by a display device 120. In some embodiments, boundary markers 415 may be a pattern, such as a quick response (QR) code. The pattern may be a coded pattern, such as a two-dimensional barcode, that contains information about contents being displayed by a display device 120.

In some embodiments, boundary markers 415 may be located at the peripheral edges or the corners of a display surface 410. As will be described, where two or more boundary markers 415 are associated with image data captured by an electronic device 110, the electronic device 110 may determine a boundary based on the location of the two or more boundary markers 415. For example, referring to FIG. 4A, four boundary markers 415 are illustrated. Each of the four boundary markers 415 is associated with a corner of the display surface 410a. In some embodiments, the electronic device 110 may determine a boundary by joining the boundary markers 415 with lines. In FIG. 4A, the determined boundary is illustrated with hashed lines. In FIG. 4A, the electronic device 110 may determine that the entire display surface 410a is within the determined boundary defined by the boundary markers 415a, 415b, 415c, 415d.

In some embodiments, the electronic device 110 may determine a boundary that circumscribes a portion of a display surface 410 that is less than the entire display surface 410. For example, referring to FIG. 4C, the captured image 450 includes content from a first display surface 410b and content from a second display surface 410c. The content from the second display surface 410c may be associated with boundary markers 415i, 415j, 415k, 415l. The boundary markers 415i, 415j, 415k, 415l may not be located at each respective corner of the rectangular display surface 410c. The electronic device 110 may determine a boundary by joining the boundary markers 415i, 415j, 415k, 415l with lines. Accordingly, the electronic device 110 may determine that a portion of the second display surface 410c is within the determined boundary defined by the boundary markers 415i, 415j, 415k, 415l. Although the examples describe boundaries that are rectangular in shape, boundary markers 415 may define boundaries that are circular in shape, triangular in shape, or any other polygon shape.

In some embodiments, the electronic device 110 may determine a boundary based on a boundary marker 415, such as a coded pattern. For example, referring to FIG. 4D, the electronic device 110 may determine a boundary based on a boundary marker 415m. When one boundary marker is associated with the content of the display surface 410d, the electronic device 110 may be unable to determine a boundary by joining multiple boundary markers 415 with lines. In some embodiments, the boundary marker 415m may be a coded pattern. The electronic device 110 may decode the coded pattern and, based on information from the coded pattern, may determine a boundary associated with contents of the display surface 410d. In some embodiments, the coded pattern may provide information defining the characteristics of a boundary.

For example, based on information from the coded pattern, the electronic device 110 may determine that a boundary 430 has a square shape and is located in the center of the display surface 410d. That is, information from the coded pattern may provide a detailed specification for the boundary 430.

In another example, contents of a display surface 410 may be associated with two boundary markers 415. In some embodiments, the electronic device 110 may join the two boundary markers 415 with a line and extrapolate the line so as to divide the display surface 410 into two portions. That is, the identified boundary may be a boundary dividing the display surface 410 into two distinct portions.

In another example, because the electronic device 110 may not be able to determine a boundary enclosing an area based on two boundary markers 415, the two boundary markers 415 may be coded patterns and the electronic device 110 may decode the coded patterns. Based on information from the coded patterns, the electronic device 110 may determine a boundary associated with the contents of the display surface.

As previously described, content of a field of view 114 of an electronic device 110 may depend on the distance between the electronic device 110 and a display device 120 and/or may depend on the focal length setting of the camera 112 associated with the electronic device 110. When the electronic device 110 is setup so that the content of a display surface 410 occupies the entire field of view 114 (see e.g., FIG. 4A), the electronic device 110 may capture image data and generate a captured image 450 having the content of the display surface 410 occupying the area of the entire captured image 450. When the electronic device 110 is setup so that the content of the display surface 410 occupies a portion of a field of view 114 (see e.g., FIGS. 4B, 4C, and 4D), the electronic device 110 may capture image data and generate a captured image 450 having the content of one or more display surfaces 410 and a background scene 460.

In some embodiments, when a boundary marker 415 is a coded pattern, an electronic device 110 may determine one or more boundaries associated with image data based on the decoded boundary marker 415. In some embodiments, information decoded from the boundary marker 415 may include absolute information relating to a boundary. For example, referring to FIG. 4D, information decoded from the boundary marker 415 may specify that a boundary associated with captured image data representing contents of a display surface 410d is a square. The square may have dimensions of 10 centimeters by 10 centimeters and the square may be centrally located in the middle of the display surface 410d.

When the electronic device 110 is setup so that the content of display surface 410 occupies less than the entire field of view 114, the electronic device 110 may not be able to accurately place a defined boundary in a generated captured image 450. That is, because the captured image 450 includes content from a display surface 410 and a background scene 460, the absolute information, such as a square dimension of 10 centimeters by 10 centimeters, may not provide sufficiently definite information to an electronic device 110 for placing a boundary in a generated captured image 450. Accordingly, in some embodiments, the electronic device 110 may need to determine a boundary in a captured image 450 based on a combination of decoded information from a boundary marker 415 and physical dimensions of a displayed boundary marker 415. As will be apparent, the electronic device 110 may utilize the physical dimensions of the displayed boundary marker 415 as a baseline for accurately placing a defined boundary in a generated captured image 450.

In an example, referring to FIG. 4D, a display device 120 may display a boundary marker 415m on a display surface 410d. The boundary marker 415m may be provided with boundary marker frames 320 that are periodically overlaid with media content frames 310. In some embodiments, the boundary marker 415m may be a coded pattern and the electronic device 110 may decode the coded pattern. The decoded information may specify that the boundary marker 415m may be a square shape and is displayed on the display surface 410d such that the boundary marker 415m appears on the display surface 410d of a display device 120 as a 5 centimeter by 5 centimeter square. Although display devices 120 may have different specifications and capabilities, a display device 120 may be able to display a boundary marker 415m, such as a coded pattern, on a display surface 410 with a known physical dimension. For example, when a display device 120 provides boundary markers 415 in boundary marker frames 320, the display device 120 may calculate the required pixel requirements to achieve the actual physical dimensions and may subsequently display the boundary marker 415m on the display surface 410d. Accordingly, although a 5 centimeter by 5 centimeter square displayed on a 30 inch display monitor may occupy less percentage of the display surface 410 than the display surface 410 of a 23 inch display monitor, a display device 120 may provide boundary markers 415 with required physical dimensions to boundary marker frames 320 by calculating necessary pixel output requirements.

Referring to FIG. 4D, based on decoding the boundary marker 415m, the electronic device 110 may determine that a boundary associated with content of the display surface 410d may be located in the center of the display surface 410d having a square dimension of 10 centimeters by 10 centimeters. Knowing that the displayed boundary marker 415m is being displayed with a square physical dimension of 5 centimeters by 5 centimeters, the electronic device 110 may determine that a physical dimension of 10 centimeters is double the length of a side of the displayed boundary marker 415m. Accordingly, the electronic device 110 may use the displayed boundary marker 415m as a baseline for placing a boundary 430 in a captured image 450. Irrespective of what percentage the content of the display surface 410d occupies in the captured image 450, the electronic device 110 may use the known characteristics of the boundary marker 415m as a guide to place a boundary in a captured image 450.

For example, the boundary marker 415m may indicate that a square-shaped boundary 430 is to be placed at the center of the display surface 410d and that the square-shaped boundary 430 has a 10 centimeter by 10 centimeter dimension. To generate and place the boundary 430 in the captured image 450, the electronic device 110 may need to determine the center of the display surface 410d and place a boundary having physical dimensions (e.g., 10 centimeters by 10 centimeters) that are double the physical dimensions of the boundary marker 415m (e.g., 5 centimeters by 5 centimeters).

In some embodiments, the coded pattern may include information about the display device 120, such as the display dimensions of the display device 120, the resolution capabilities of the display device 120, or the refresh rate capabilities of the display device 120. In some embodiments, the coded pattern may include information about the location of the one or more boundary markers being displayed on the display device 120. In some embodiments, the coded pattern may include information about the location of an identified boundary on the display device 120. That is, the coded pattern may include information about the location of an identified boundary associated with image data captured by the electronic device 110.

In some examples, a select portion of the display surface 410 may occupy the entire field of view 114 of the electronic device 110. For example, the user 102 may position the electronic device 110 to be relatively near a display device 120 such that the field of view 114 may only capture a select portion of the contents of the display surface 410. Referring to again to FIG. 4D as an example, if the electronic device 110 is located near the display surface 410d such that the field of view 114 is occupied by contents of the lower right corner of the display surface 410d, although a boundary marker 415m may be viewable from a display surface 410d, a camera 112 of the electronic device 110 may not detect the boundary marker 415m. That is, the boundary marker 415m may not be within the field of view 114 of the camera 112.

Accordingly, in some embodiments, boundary marker frames 320 may include a plurality of boundary presence markers (not illustrated in FIG. 4D) scattered across each boundary marker frame 320. That is, in addition to a boundary marker 415m, boundary presence markers may be displayed at repeated intervals across the boundary marker frames 320. Each boundary presence marker may, for example, be a small circle that may be spaced 100 pixels from an adjacent boundary presence marker. Accordingly, even though the boundary marker 415m may not be within a field of view 114 of a camera 112, a processor 202 may determine that image data being captured is associated with a boundary marker 415m and that the boundary marker 415m may not be within the field of view 114. Subsequently, in some embodiments, the processor 202 may notify the user 102 of the electronic device 110 that boundary information may be associated with the contents of the display surface 410 and may instruct the user 102 to relocate the electronic device 110 for capturing boundary information.

As apparent from the description of examples with reference to FIGS. 3, 4A, 4B, 4C, and 4D, boundary marker frames 320 may include one or more boundary markers 415. A display device 120 may interleave or overlay one or more boundary marker frames 320 with media content frames 310 for display on a display surface 410. The frequency at which the boundary marker frames 320 are provided may be less than the frequency at which the media content frames 310 are provided. Accordingly, the boundary marker frames 320 may be undetectable by a human eye viewing the display device 120. The boundary marker frames 320 may be detectable by a camera of an electronic device 110. Accordingly, a display device 120 may be able to convey information to an electronic device 110 through a mechanism that is undetectable or imperceptible to an unaided human eye.

An electronic device 110 may capture image data using a camera 112 associated with the electronic device 110. The electronic device 110 may generate a captured image 450 based on the image data. The captured image 450 may represent content displayed on one or more display surfaces 410 and one or more background scenes 460 within a field of view 114 of the camera 112. The electronic device 110 may also determine a boundary associated with the image data captured by a camera 112 of the electronic device 110 and associate the boundary with a portion of the image data for generating the captured image 450. The boundary may be based on the one or more boundary markers 415 provided in boundary marker frames 320, where the boundary marker frames 320 are interleaved or overlaid with media content frames 310.

Figure 5:
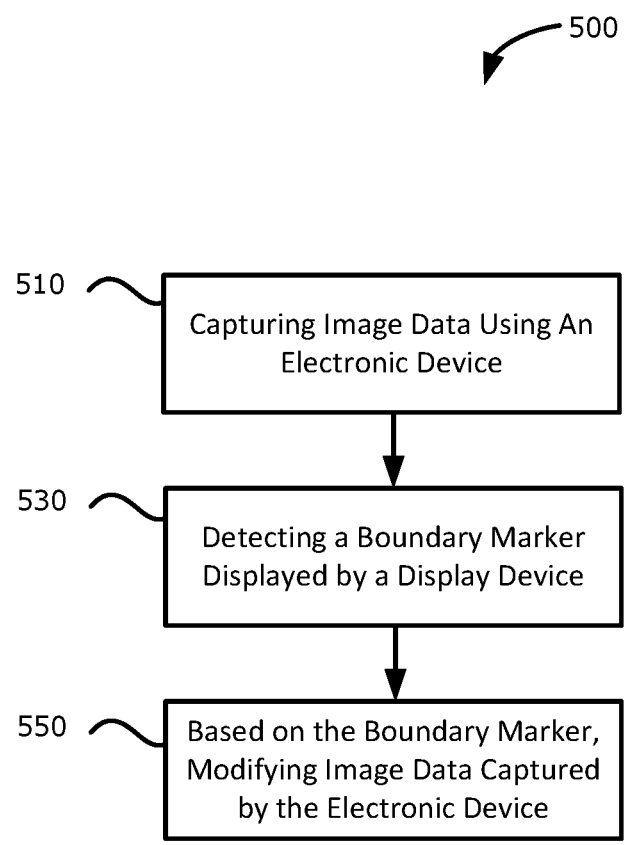
FIG. 5 is a flowchart illustrating an example method of determining a boundary associated with image data captured by an electronic device.

Reference is now made to FIG. 5, which is a flowchart illustrating an example method 500 of determining a boundary associated with image data captured by an electronic device 110. The method 500 may be performed by an electronic device 110 of the type described above with reference to FIGS. 1 and 2 or a variation of such electronic devices. For example, in at least some embodiments, processor-executable instructions 220, such as a boundary detection application 224, may configure a processor 202 of the electronic device 101 to perform the method 500.

At 510, the method includes capturing image data using the electronic device 110. For example, the processor 202 may capture image data using a camera 112 of the electronic device 110. The processor 202 may capture image data based on content of a field of view 114 of an electronic device 110. The processor 202 may be capable of capturing image data, such as images, in the form of still photo and/or motion data. The image data may be generated in the form of an electronic signal which may be produced by an image sensor associated with the camera 112 of the electronic device 110.

At 530, based on the captured image data, the processor 202 may detect a boundary marker 415 displayed by a display device 120. The boundary marker 415 may be provided in a boundary marker frame 320 by the display device 120. The boundary marker frames 320 may be periodically displayed to be undetectable by a human eye that is viewing the display device 120.

In some embodiments, the processor 202 may capture a plurality of frames. Media content frames 310 may be displayed by a display device 120 at a first frequency. Boundary marker frames 320 may be displayed by the display device 120 at a second frequency. The first frequency may be greater than the second frequency. For example, referring again to FIG. 3, the display device 120 may provide boundary marker frames 320 at a second frequency and the display device 120 may provide media content frames 310 at a first frequency. Relative to the media content frames 310, the boundary marker frames 320 may be provided periodically. When an unaided eye of a user 102 views the display device 120, the user 102 may not perceive the boundary marker frames 320. That is, the media content frames 310 may be provided at a higher frequency relative to the frequency of the provided boundary marker frames 320 such that the periodically interleaved boundary marker frames 320 are not noticed by the user.

A user 102 may operate an electronic device 110 within a line of sight of a display surface 410 of a display device 120. The electronic device 110 may capture image data associated with media content frames 310 and boundary marker frames 320. Accordingly, the processor 202 may detect one or more boundary markers 415 displayed by the display device 120; however, an unaided human eye may not be able to detect the one or more boundary markers 415 displayed by the display device 120.

At 550, based on the boundary marker 415, the processor 202 may modify image data captured by the electronic device. As will be described, in some embodiments, the processor 202 may generate, based on a plurality of detected image frames, a watermarked or captured image 450 including a plurality of boundary markers 415. In some embodiments, the processor 202 may generate, based on the image data, a captured image 450. In some embodiments, the captured image 450 may include an identified boundary. In some embodiments, an identified boundary may be a line that marks a circumscribed portion of a captured image 450. For example, an identified boundary may be a line that divides a display surface 410 into two portions. In another example, an identified boundary may be a curved line having joining ends to circumscribe a portion of a captured image 450.

As described, the electronic device 110 may have a camera 112 associated with an image sensor. In some embodiments, an image sensor of a camera 112 may scan a field of view 114 and the electronic device 110 may detect sufficient image data to generate a captured image 450 based on a single captured image frame.

In some other embodiments, the image sensor may require multiple detected images, or detected image frames, to capture sufficient image data for generating a captured image 450 containing content on display surfaces 410, a complete set of boundary markers 415 associated with the content on the display surfaces 410, and a background scene 460. That is, the processor 202 may scan a field of view 114 and detect two or more image frames.

For example, the processor 202 may scan a field of view 114 from a top of a display surface 410 to a bottom of a display surface 410 and from a left side of a display surface 410 to a right side of a display surface 410. Each of the detected two or more image frames may include a subset of the complete set of boundary markers 415, a subset of the content on the display surfaces 410, and/or a subset of the background scene 460. As will be apparent, in some embodiments, the processor 202 may generate a watermarked or captured image 450 including the complete set of boundary markers 415 based on the plurality of detected image frames.

In some embodiments, a display device 120 may interleave media content frames 310 with boundary marker frames 320. The boundary marker frames 320 may include two or more boundary markers 415 located at different portions of an image frame. For example, the boundary marker frame 320 may provide a first boundary marker 415 at the top of the image frame and a second boundary marker 415 at the bottom of the image frame. Accordingly, when an image sensor associated with a camera 112 may scan a field of view 114, the electronic device 110 may detect a plurality of image frames to generate a captured image 450 and each of the plurality of image frames may only contain a subset of the two or more boundary markers 415 associated with the boundary marker frames 320. Thus, in some embodiments, the processor 202 may utilize multiple captured image frames for generating a captured image 450 that includes boundary markers.

Figure 6:
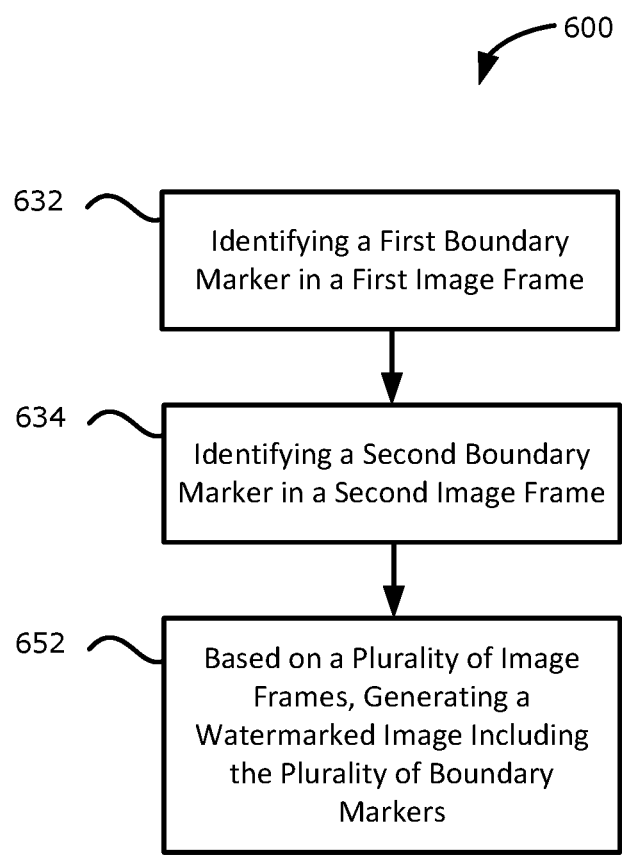
FIG. 6 is a flowchart illustrating an example method of detecting a boundary marker and modifying image data.

Reference is now made to FIG. 6, which is a flowchart illustrating an example method 600 of detecting a boundary marker 415 and modifying image data. The method 600 may be performed by an electronic device 110 of the type described above with reference to FIGS. 1 and 2 or a variation of such electronic devices. For example, in at least some embodiments, processor-executable instructions 220, such as a boundary detection application 224, may configure a processor 202 of the electronic device 110 to perform the method 600.

In some embodiments, a boundary marker may include a plurality of boundary markers 415. For example, referring to FIG. 4A, the plurality of boundary markers may include four boundary markers 415a, 415b, 415c, 415d. Although the example in FIG. 4A includes four boundary markers, a display device 120 may display content being associated with any number of boundary markers 415. In some embodiments where the image sensor of a camera 112 is not capable of capturing a full image sensor pixel array at a given time, the processor 202 may need to detect boundary markers in two or more image frames.

At 632 and 634, the processor 202 may detect the plurality of boundary markers 415. More particularly, at 632, the processor 202 may detect a first boundary marker in a first captured image frame. For example, referring to FIG. 4A, the processor 202 may detect a first boundary marker 415a (and/or boundary marker 415b) in a first captured image frame. Continuing with the example described above, where an electronic device 110 has an image sensor that may scan a field of view 114 and may capture multiple image frames, the processor 202 may detect a first boundary marker 415a (and/or boundary marker 415b) at the top of first image frame and may be unable to simultaneously detect a second boundary marker 415c (and/or boundary marker 415d) located at the bottom of that first image frame.

At 634, the processor 202 may detect a second boundary marker in a second captured image frame. For example, in FIG. 4A, the processor 202 may detect a second boundary marker 415c (and/or boundary marker 415d) in a second captured image frame. That is, the processor 202 may detect a second boundary marker 415c (and/or boundary marker 415d) at the bottom of that second captured image frame.

Although in the example above, a first and a second captured image frame is discussed, the processor 202 may detect any number of captured image frames. Each of the any number of image frames detected by the processor 202 may contain a boundary marker 415. Because in some embodiments, the image sensor may scan a field of view 114 and capture a plurality of image frames, each of the any number of image frames may not include all of the boundary markers 415 being displayed by a boundary marker frame 320. That is, if a boundary marker frame 320 were to contain boundary markers 415a, 415b, 415c, 415d, the processor 202 may be capable of detecting captured image frames each having a subset number of the boundary markers 415a, 415b, 415c, 415d.

At 652, based on a plurality of detected or captured image frames, the processor 202 may generate a watermarked or captured image 450 including the plurality of boundary markers 415. That is, in FIG. 4A, the processor 202 may generate a captured image 450 that includes the content of display surface 410a and the plurality of boundary markers 415a, 415b, 415c, 415d. Accordingly, to accommodate image sensors associated with cameras 112 that may scan a field of view 114 and/or may require two or more captured image frames to generate a captured image 450, the processor 202 may detect boundary markers 415 within a field of view 114 over two or more detected frames.

In some other embodiments, an image sensor may capture sufficient image data to generate a captured image 450 containing content of the display surfaces 410, a complete set of boundary markers 415, and the background scene 460 based on a single captured image frame. That is, the image sensor may not require multiple captured image frames for generating a watermarked or captured image 450.

Figure 7:
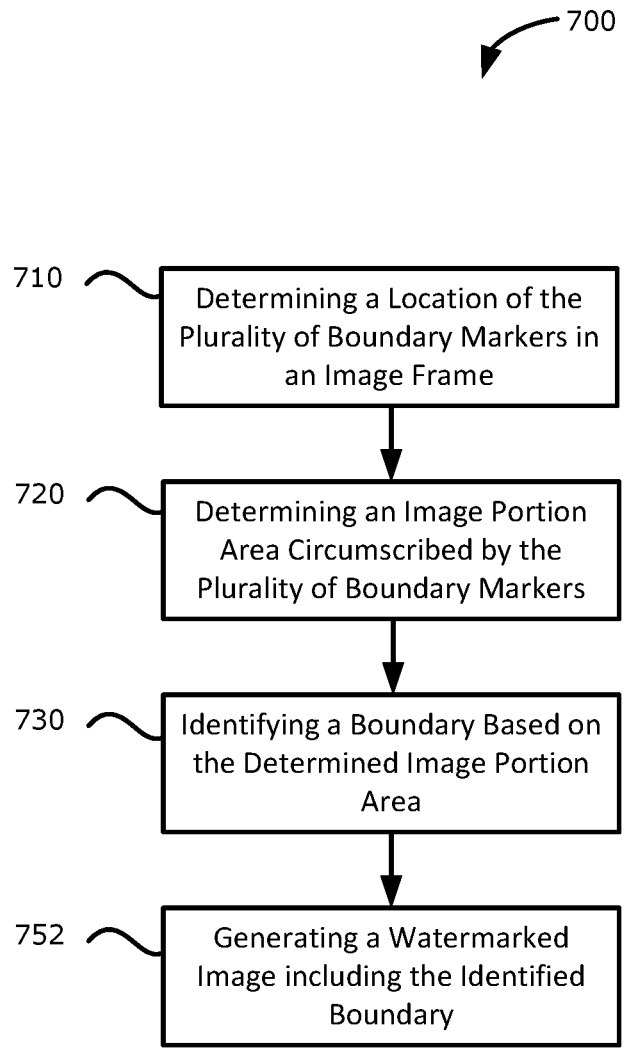
FIG. 7 is a flowchart illustrating an example method of identifying a boundary and modifying image data.

Reference is now made to FIG. 7, which is a flowchart illustrating an example method of identifying a boundary and modifying image data. The method 700 may be performed by an electronic device 110 of the type described above with reference to FIGS. 1 and 2 or a variation of such electronic devices. For example, in at least some embodiments, processor-executable instructions 220, such as a boundary detection application 224, may configure a processor 202 of the electronic device 110 to perform the method 700.

In some embodiments, a boundary marker may include a plurality of boundary markers 415. For example, referring to FIG. 3, a display device 120 may successively display a plurality of boundary marker frames 320. Each boundary marker frame 320 may include two or more boundary markers 415. For example, as illustrated in FIGS. 4A, 4B and 4C, a display device 120 may display two or more boundary markers 415a to 415l. Although the examples in FIGS. 4A, 4B, and 4C include four boundary markers 415 being associated with each display surface 410, a display surface 410 may be associated with any number of boundary markers 415 and the boundary markers 415 may be located at any position on the display surface 410. The boundary markers 415 may mark off portions of a display surface 410 that include corner portions of a display surface 410, center portions of a display surface 410, or any other located portion of a display surface 410.

At 710, the processor 202 may determine the location of the plurality of boundary markers in an image frame. For example, referring to FIG. 4C, the processor 202 may determine the location of the plurality of boundary markers on a display surface 410. In FIG. 4C, the processor 202 may determine that four boundary markers 415e, 415f, 416g, 416h are associated with content displayed on a first display surface 410b. Further, the processor 202 may determine that four boundary markers 415i, 415j, 415k, 415l are associated with content displayed on a second display surface 410c. In FIG. 4C, the four boundary markers associated with content displayed on a first display surface 410b are located at the four respective corners of the rectangular display surface 410b. Further, the four boundary markers associated with content displayed on a second display surface 410c are located near a lower left portion of the second display surface 410c.

At 720, the processor 202 may determine an image portion area circumscribed by the plurality of boundary markers 415. For example, referring to FIG. 4C, the processor 202 may determine that the four boundary markers 415e, 415f, 415g, 415h circumscribe the content being displayed by the first display surface 410b. Further, the processor 202 may determine that the four boundary markers 415i, 415j, 415k, 415l circumscribe an image portion area near the lower left corner of the content being displayed by the second display surface 410c.

At 730, the processor 202 may identify a boundary based on the determined image portion area. For example, continuing with the example relating to FIG. 4C, the processor 202 may identify a boundary based on the determined image portion area circumscribed by the four boundary markers 415e, 415f, 415g, 415h. The identified boundary, for instance, is illustrated within the first display surface 410b as hashed lines.

In some embodiments, the processor 202 may determine that a plurality of boundary markers 415 is located along peripheral edges of an image frame. For example, as described above, in FIG. 4C, the boundary markers 415e, 415f, 415g, 415h are located at the respective corners and are also located along the peripheral edges of the first display surface 410b. Accordingly, the processor 202 may determine that the complete image frame is within an identified boundary. That is, all the content being displayed on the display surface 410b may be circumscribed by the identified boundary.

In another example, referring to FIG. 4C, the processor 202 may identify a boundary based on the determined image portion area circumscribed by the four boundary markers 415i, 415j, 415k, 415l of the second display surface 410c. The identified boundary, for instance, is illustrated as a rectangle in the lower left corner of the second display surface 410c.

In the above examples, although the identified boundaries are illustrated as having a rectangular shape, in some embodiments, the identified boundaries could be any other shape. For example, identified boundaries could have a circular or oval shape or an irregular shape.

At 752, the processor 202 may generate a watermarked image based on detected image data. The processor 202 may generate a captured image 450 based on content viewable within the field of view 114 and the captured image 450 may be a watermarked image including the identified boundary. For example, in some embodiments, the processor 202 may illustrate the boundary in the captured image 450. In some embodiments, the processor 202 may not illustrate the boundary in the captured image 450, but rather identify the boundary in meta-data. In some embodiments, the identified boundary may be used for other features executable by the processor 202.

In some embodiments, a display device 120 may provide boundary markers 415 associated with boundary marker frames 320 for identifying media content portions. For example, referring to FIG. 4C, the image data or content circumscribed by a boundary defined by the boundary markers 415i, 415j, 415k, 415l may be confidential information. By providing boundary markers 415i, 415j, 415k, 415l, the display device 120 may identify such content as confidential. Accordingly, when an electronic device 110 configured to detect boundary markers 415 captures image data within a field of view 114 containing the display surface 410c, the electronic device 110 may identify the boundary defined by the boundary markers 415i, 415j, 415k, 415l and may execute a function on the content circumscribed by the boundary markers 415i, 415j, 415k, 415l. For example, if the content was deemed to be confidential, in some embodiments, the electronic device 110 may further process the captured image data associated with content displayed on the display surface 410c and visually obscure the content circumscribed by the identified boundary. That is, using the identified boundary, the electronic device 110 may identify confidential content and may ensure the confidential content may not saved to the electronic device 110 and may not be re-transmitted to unauthorized parties.

The above example embodiments allow confidential information to be provided on a display device 120 for viewing by a user 102. Simultaneously, the above example embodiments may prevent confidential information from being photographed or imaged by an electronic device 110 that is configured to identify one or more boundaries associated with media content frames 310 and to obscure information circumscribed by the identified one or more boundaries.

Although the above example utilizes the boundary markers 415 for identifying confidential information being displayed on a display surface 410, the boundary markers 415 may be used for identifying content being displayed on a display surface 410 for any other purpose. For example, the boundary markers 415 may be used for identifying regions of content that may be used as a template for superimposing other images.

Figure 8:
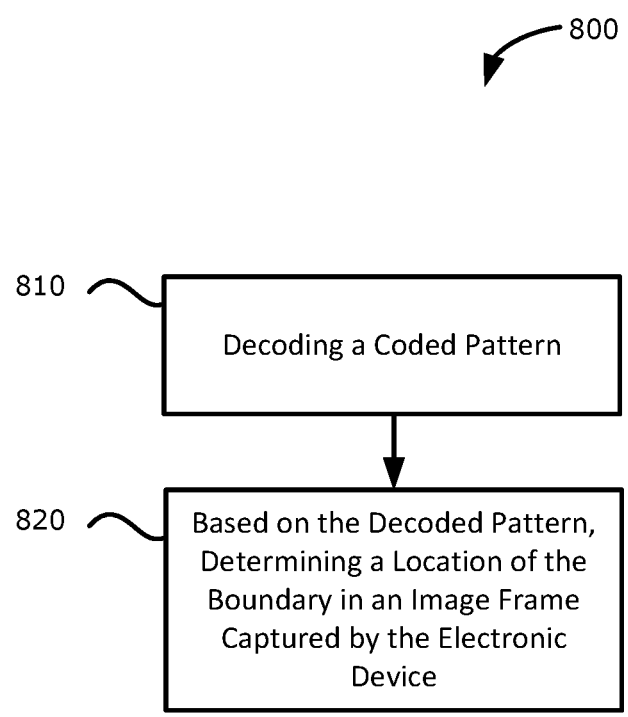
FIG. 8 is a flowchart illustrating an example method of determining a location of a boundary based on a decoded boundary marker.

Reference is now made to FIG. 8, which is a flowchart illustrating an example method 800 of determining a location of a boundary based on a decoded boundary marker. The method 800 may be performed by an electronic device 110 of the type described above with reference to FIGS. 1 and 2 or a variation of such electronic devices. For example, in at least some embodiments, processor-executable instructions 220, such as a boundary detection application 224, may configure a processor 202 of the electronic device 110 to perform the method 800.

In some embodiments, a display device 120 may display a boundary marker 415. That is, referring again to FIG. 3, each of the boundary marker frames 320 may include one boundary marker 415. The boundary marker 415 may be a coded pattern, such as a quick response (QR) code. For example, the coded pattern may be a two-dimensional barcode that contains information about contents being displayed by the display device 120. The coded pattern may be any type of pattern that may be discernible by an electronic device 110 and that may have associated meaning. For example, the coded pattern may include encoded information. In some embodiments, the encoded information may include display device dimension information, boundary marker location information, and boundary location. That is, the encoded information may include information relating to the location of the boundary marker on the display device 120 and the location of the boundary on the display device 120. The display device dimension information may include information relating to the size of the display device 120, the refresh rate capabilities of the display device 120, and the maximum pixel output dimensions of the display device 120.

At 810, the processor 202 may decode the coded pattern of a boundary marker 415. For example, referring to FIG. 4D, a boundary marker 415m may be provided with boundary marker frames 320. The boundary marker 415m may be a coded pattern, such as a two-dimensional barcode, and the electronic device 110 may decode the coded pattern.

In some embodiments, the decoded information may include information relating to the specification and capabilities of the display device 120 that may be providing the media content frames 310 and the boundary marker frames 320. In some embodiments, the decoded information may include a specification of the boundary that is associated with image data related to media content frames 310. For example, the decoded information may include information relating to the boundary marker locations on the display device. In some examples, the decoded information may include information relating to the boundary location on a display surface. In some examples, the decoded information may specify that a boundary is located in the center of a display surface 410 or at a top left corner of the display surface. In some examples, the display surface 410 may be associated with a coordinate grid system and the decoded information may specify the location of a boundary in terms of coordinates in the coordinate grid system.

In some embodiments, the decoded information may contain information related to defined physical features of the boundary marker 415m as provided on the display device 120. For example, the decoded information may specify that the boundary marker 415m illustrated in FIG. 4D may be a square shape and may physically appear on the display surface 410d as a 5 centimeter by 5 centimeter square. That is, the display device 120 may calculate the pixel requirements of the display device 120 for providing the actual physical dimension of the boundary marker 415m on the display surface 410d. For example, because the pixel requirements to display a 5 centimeter by 5 centimeter square on a 30 inch monitor may be different than the pixel requirements to display a 5 centimeter square by 5 centimeter square on a 23 inch monitor, a respective display device 120 may be tasked with providing the boundary marker 415m in accordance with defined physical features.

In some embodiments, the processor 202 may utilize known physical features of a boundary marker 415m as a baseline for accurately placing a defined boundary in a generated captured image 450.

Accordingly, at 820, based on the decoded pattern, the processor 202 may determine the location of the boundary in an image frame captured by the electronic device 110. That is, the processor 202 may decode the coded pattern and, based on the decoded pattern, the processor 202 may determine a location of the boundary in an image frame captured by the electronic device 110.

In some embodiments, the processor 202 may utilize known physical features of a boundary marker 415m as a baseline for accurately placing a defined boundary in a generated captured image 450. Referring to FIG. 4D, a display device 120 may display a boundary marker 415m on a display surface. An electronic device 110 may decode the boundary marker 415m and the decoded information may specify that the boundary marker 415m may be a square shape with physical dimensions of 5 centimeters by 5 centimeters. Further, the decoded information may specify that a boundary associated with content of the display surface 410d may be located in the center of the display surface 410d. Further, the boundary may be a square having a square dimension of 10 centimeters by 10 centimeters. Knowing that the displayed boundary marker 415m is displayed with a square physical dimension of 5 centimeters by 5 centimeters, the electronic device 110 may associate a square boundary at the center of the display surface 410d having dimensions that are double the dimensions of the boundary marker 415m. Accordingly, the electronic device 110 may use the displayed boundary marker 415m as a relative baseline for placing a boundary 430 in a captured image 450.

In another example, the decoded information may specify that a boundary associated with content of the display surface 410d may be located in the center of the display surface 410d. Further, the boundary may be a circle having a radius of 5 centimeters. Knowing that the displayed square boundary marker 415m is displayed having a side dimension of 5 centimeters, the electronic device 110 may place a circular boundary at the center of the display surface 410d having a radius dimension that is equal in length to a side of the square boundary marker 415m. Accordingly, the electronic device 110 may use the displayed boundary marker 415m as a relative baseline for placing a circular boundary (not shown in FIG. 4D) in a captured image 450.

In some embodiments, boundary marker frames 320 may provide two or more boundary markers 415, where each of the two or more boundary markers 415 are coded patterns. In some embodiments, the processor 202 may identify a boundary based on a combination of content circumscribed by two or more boundary markers 415 and decoded information from the two or more boundary markers 415. As an illustrative example, referring to FIG. 4C, a processor 202 may decode a pattern associated with each of the boundary markers 415i, 415j, 415k, 415l provided on the display surface 410c. The decoded information from the boundary markers 415i, 415j, 415k, 415l may indicate that a star-shaped boundary (not shown) may be placed within the area circumscribed by the location of the boundary markers 415i, 415j, 415k, 415l.

In some embodiments, boundary marker frames 320 may include two or more boundary markers 415 for specifying two or more distinct boundaries. For example, the boundary markers 415 may specify two or more boundaries for identifying two or more areas of content displayed on a display surface 410.

Figure 9:
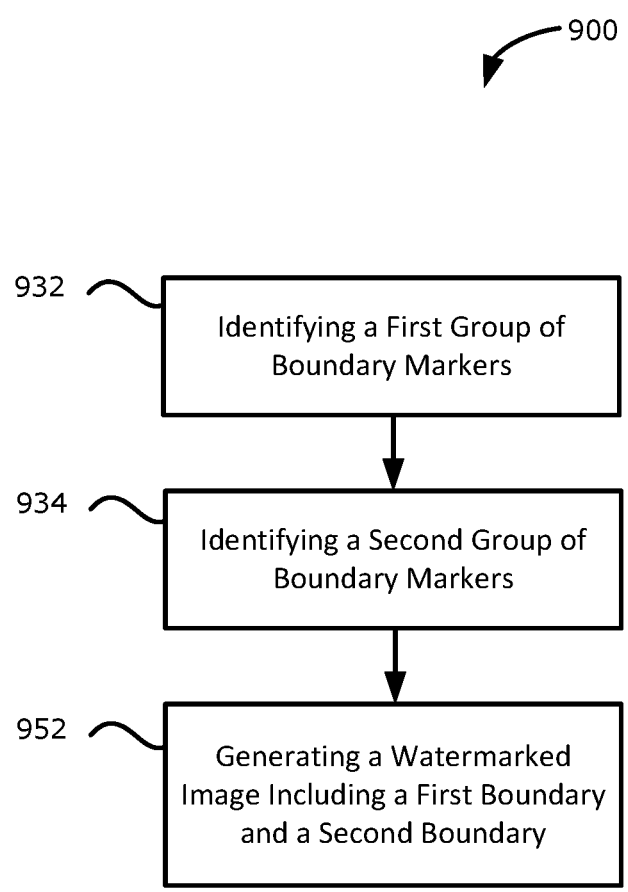
FIG. 9 is a flowchart illustrating an example method of detecting boundaries and modifying image data.

Reference is now made to FIG. 9, which is a flowchart illustrating an example method 900 of detecting boundaries and modifying image data. The method 900 may be performed by an electronic device 110 of the type described above with reference to FIGS. 1 and 2 or a variation of such electronic devices. For example, in at least some embodiments, processor-executable instructions 220, such as a boundary detection application 224, may configure a processor 202 of the electronic device 101 to perform the method 900.

In some embodiments, boundary markers 415 may include a first group of boundary markers and a second group of boundary markers. For example, referring to FIG. 4C, a first group of boundary markers 415e, 415f, 415g, 415h may be displayed on a first display surface 410b and a second group of boundary markers 415i, 415j, 415k, 415l may be displayed on a second display surface 410c.

At 932, the processor 202 may identify the first group of boundary markers 415e, 415f, 415g, 415h. For example, when two or more display devices 120 are within the field of view of an electronic device 110 having a camera 112, the processor 202 may identify boundary markers 415 that are associated with a first display surface 410b to be part of a first group of boundary markers.

At 934, the processor 202 may identify the second group of boundary markers 415i, 415j, 415k, 415l. For example, the processor 202 may identify boundary markers 415 that are associated with a second display surface 410c to be part of a second group of boundary markers.

At 952, based on image data captured by the electronic device 110, the processor 202 may generate a watermarked image. The watermarked image may be a captured image 450. The captured image 450 may include a first boundary based on a first group of boundary markers 415e, 415f, 415g, 415h. For example, referring to FIG. 4C, the first boundary may be illustrated as hashed lines connecting the boundary markers 415e, 415f, 415g, 415h. Further, the captured image 450 may include a second boundary based on a second group of boundary markers 415i, 415j, 415k, 415l. That is, the second boundary may be illustrated as hashed lines connecting the boundary markers 415i, 415j, 415k, 415l. The first boundary includes at least a first portion of an image frame that is distinct from a second portion of the image frame included by the second boundary. For example, as illustrated in FIG. 4C, the first boundary includes at least a first portion of a captured image 450 that is distinct from a second portion of a captured image 450 included by the second boundary.

Although the first boundary and the second boundary are illustrated as circumscribing non-overlapping portions of the captured image 450, in some embodiments, the first boundary and the second boundary may be overlapping.

In FIG. 4C, although the first boundary is associated with a first display surface 410b and the second boundary is associated with a second display surface 410c, in some embodiments, a first group of boundary markers and a second group of boundary markers may both be associated with a single display surface 410. For example, a first group of boundary markers may circumscribe a display surface area in a top left corner of a display surface 410 and a second group of boundary markers may circumscribe a display surface area in a lower right corner of the display surface 410.

In some embodiments, each of a plurality of boundary markers 415 may be a coded pattern. The processor 202 may decode each of the coded patterns and information from the coded pattern may identify whether each of the plurality of boundary markers 415 may be part of a first group of boundary markers or may be part of a second group of boundary markers. Although a first group of boundary markers and a second group of boundary markers is described, in some embodiments, there may be any number of groups of boundary markers.

In some embodiments, the processor 202 may identify the distinct boundaries and further process image data circumscribed by the distinctly identified boundaries. For example, the processor 202 may obscure any image data circumscribed by the first boundary such that the image data is no longer visually discernible. Further, the processor 202 may visually enhance any image data circumscribed by the second boundary such that the image data is enlarged for ease of viewing. In some embodiments, the processor 202 may apply the same or different image processing or other operations to image data circumscribed by the two respective identified boundaries.

In some of the examples discussed above, the processor 202 may identify boundaries at specified locations of a captured image 450. In some embodiments, a processor 202 may identify boundaries relative to image data. As will be apparent, image data may be associated with specific application programs installed on an electronic device 110 and the processor 202 may identify and associate a boundary to a specific application program.

Figure 10:
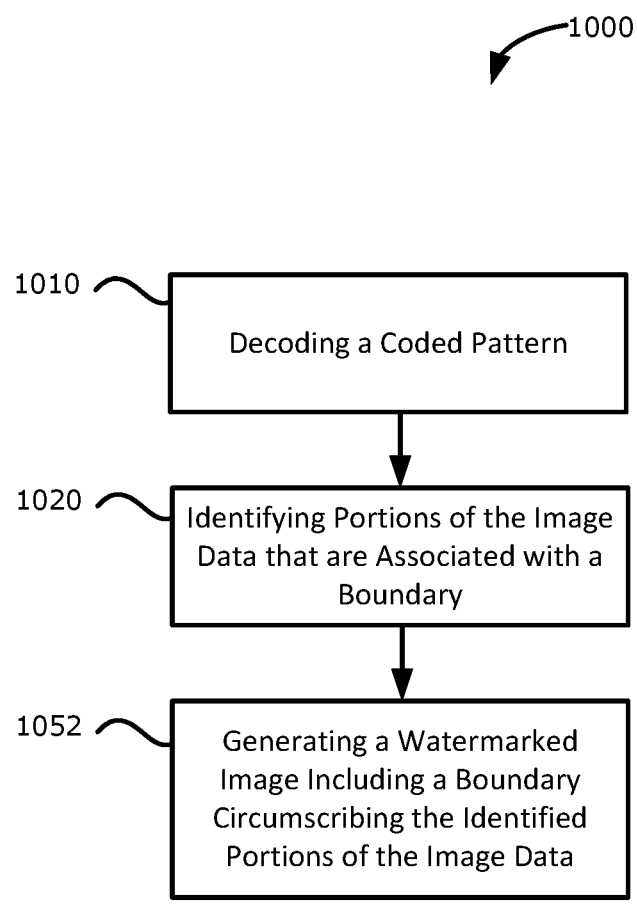
FIG. 10 is a flowchart illustrating an example method of identifying portions of image data associated with a boundary and modifying image data.

Reference is now made to FIG. 10, which is a flowchart illustrating an example method 1000 of identifying portions of image data associated with a boundary and modifying image data. The method 1000 may be performed by an electronic device 110 of the type described above with reference to FIGS. 1 and 2 or a variation of such electronic devices. For example, in at least some embodiments, processor-executable instructions 220, such as a boundary detection application 224, may configure a processor 202 of the electronic device 110 to perform the method 1000.

In some embodiments, a boundary marker 415 may be a coded pattern. The coded pattern may be discernible by a processor 202. The coded pattern, such as a two-dimensional barcode, may contain information about contents being displayed on a display surface 410 of a display device 120. The coded pattern may provide information associating a boundary with portions of identified image data captured by a processor 202 of an electronic device 110.

At 1010, the processor 202 may decode a coded pattern associated with a boundary marker 415. For example, the boundary marker 415 may be a coded pattern, such as a quick response (QR) code. In some embodiments, the coded pattern may be a two-dimensional barcode that contains information associating a boundary with portions of image data captured by the electronic device 110. The coded pattern may be encoded information. The encoded information may contain information specifying that the boundary circumscribes image data of a specific data type. That is, the encoded information may associate the boundary with portions of image data captured by the electronic device 110. For example, the coded pattern may provide information specifying that a boundary circumscribe a cluster of JPEG image data and that a separate boundary circumscribe a cluster of GIF image data. In another example, the coded pattern may provide information specifying image data that may be associated with a person's face in a photograph and that a boundary may be associated with the person's face.

In some embodiments, the coded pattern of a boundary marker 415 may provide information specifying that a boundary circumscribes data associated with an application. For example, the coded pattern may provide information specifying a boundary for circumscribing the application window of an email application.

At 1020, the processor 202 may identify portions of image data that are associated with the boundary. In some embodiments, based on information provided by a decoded boundary marker 415, the processor 202 may identify portions of image data that are associated with a specific purpose. For example, the processor 202 may identify portions of image data associated with an email application being displayed on the display surface 410. In another example, the processor 202 may identify portions of image data associated with a person's head in a photograph being displayed on the display surface 410.

At 1052, based on portions of image data associated with a boundary, the processor 202 may generate a watermarked image including the boundary circumscribing the identified portions of image data. The watermarked image may be a captured image 450 and the captured image 450 may include one or more boundaries associated with specific image data. For example, at 1020, if the processor 202 had identified that portions of image data that was captured by the processor 202 are associated with an email application, at 1052, the processor 202 may generate a captured image 450 that includes image data and that overlays a boundary circumscribing the image data associated with an email application interface window.

In some embodiments, application interface windows, such as email applications or database interface windows, may contain confidential or proprietary information. Accordingly, a display device 120 may be configured to display boundary marker frames 320 (including one or more boundary markers) interleaved with media content frames 310. The one or more boundary markers 415 may provide information for associating a boundary with media content frames 310 or data shown in the media content frames. When a processor 202 of an electronic device 110 captures image data based on the media content frames 310 and detects one or more boundary markers 415 being periodically displayed in boundary marker frames 320, the processor 202 may decode the boundary markers 415, identify one or more boundaries to be associated with image data, and generate a captured image 450 including the identified one or more boundaries. For example, the image data associated with the one or more boundaries may be identified as confidential information and the processor 202 may modify the image data circumscribed by the one or more boundaries. Accordingly, a display device 120 may display confidential information on a display surface 410, and also provide an indication with boundary markers 415 to an electronic device 110 that the information being displayed is confidential. Because the boundary markers 415 are included in boundary marker frames 320 being periodically overlaid with media content frames 310, the electronic device 110 may detect the boundary markers 415 while an unaided human eye is unable to detect the boundary markers 415.

Figure 11:
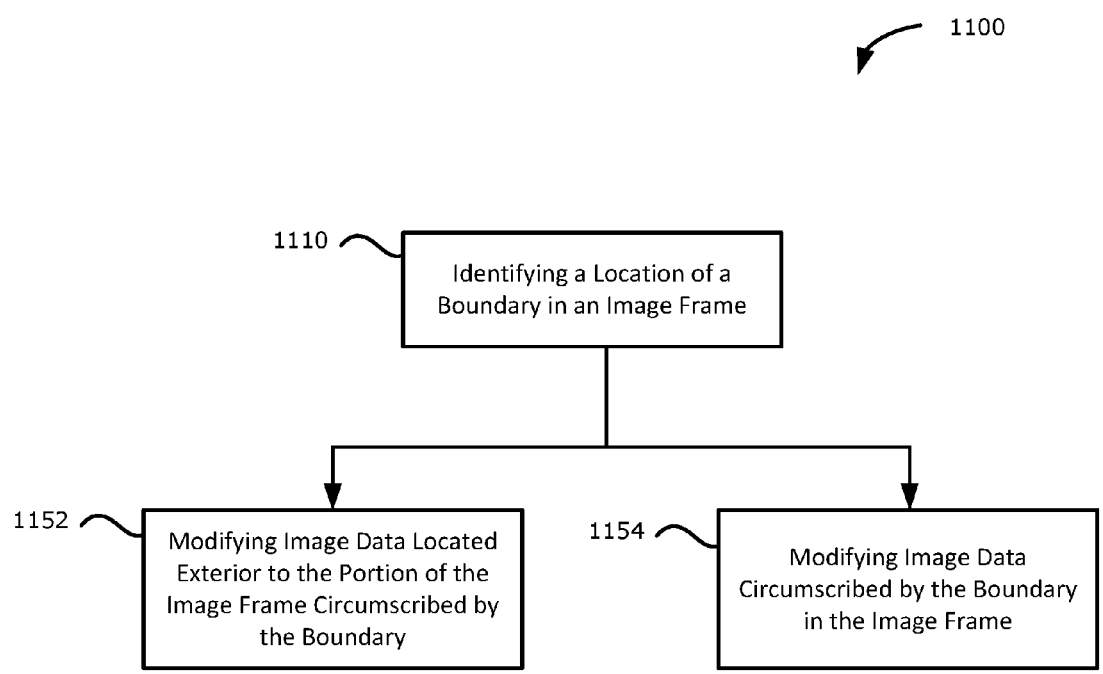
FIG. 11 is a flowchart illustrating an example method of modifying image data.

As described, in some embodiments, when a processor 202 identifies image data to be circumscribed by an identified boundary, the processor 202 may be configured to further process the identified image data. Reference is now made to FIG. 11, which is a flowchart illustrating an example method of modifying image data. The method 1100 may be performed by an electronic device 110 of the type described above with reference to FIGS. 1 and 2 or a variation of such electronic devices. For example, in at least some embodiments, processor-executable instructions 220, such as a boundary detection application 224, may configure a processor 202 of the electronic device 110 to perform the method 1100.

At 1110, based on a boundary marker 415, the processor 202 may identify a location of a boundary in an image frame. That is, based on one or more boundary markers 415 provided in the boundary marker frames 320, the processor 202 may identify the location of a boundary in a captured image 450. The location of a boundary in a captured image 450 may be identified according to the methods described herein.

At 1152, the processor 202 may modify image data located exterior to a portion of the image frame circumscribed by the boundary. For example, referring to FIG. 4C, four boundary markers 415i, 415j, 415k, 415l circumscribe a rectangular portion of the content displayed on a display surface 410c. When the processor 202 identifies that the boundary, for example illustrated as hashed lines connecting the four boundary markers 415i, 415j, 415k, 415l, the processor 202 may modify image data located exterior to the portion of the captured image 450 circumscribed by the boundary. In some embodiments, the processor 202 may increase or decrease the view-ability of the image data located exterior to the boundary.

For example, a set of processor-executable instructions 220 may be associated with a photography editing application. At 1110, a processor 202 may identify a location of a boundary in a captured image 450. For example, the identified boundary may circumscribe several people in a photograph. At 1152, the processor 202 may modify image data located exterior to the portion of the captured image circumscribed by the boundary. For example, a user 102 may apply a blurring effect to portions of the photograph such when a user 102 views the captured image 450, attention may be drawn to the people contained in the photograph.

At 1154, the processor 202 may modify image data circumscribed by the boundary in an image frame. For example, referring to FIG. 4C, four boundary markers 415i, 415j, 415k, 415l circumscribe a rectangular portion of the content displayed on a display surface 410c. Once the processor 202 identifies the boundary, illustrated as hashed lines connecting the four boundary markers 415i, 415j, 415k, 415l, the processor 202 may modify image data circumscribed by the boundary in the captured image 450.

For instance, the processor 202 may modify the image data circumscribed by the boundary such that the image data is no longer discernible to an unaided human eye. For example, a user 102 may want to render image data circumscribed within an identified boundary to be no longer discernible to an unaided human eye because image data may represent confidential information.

In another example, the processor 202 may modify the image data circumscribed by the boundary such that the image data is enhanced for increased view-ability by a human eye. That is, the identified boundary may be used to identify image data that may be enhanced for easier viewing.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of capturing an image displayed on an external display device and detected by an electronic device, the method comprising:
generating image data associated with the detected image using the electronic device;
detecting, by the electronic device, a first group of boundary markers displayed by the external display device, the first group of boundary markers being periodically displayed to be undetectable by a human eye that is viewing the external display device;
in response to detecting the first group of boundary markers, determining image regions associated with the generated image data including a first image region circumscribed by the first group of boundary markers and a second image region being distinct from the first image region; and
modifying, regional image data associated with at least one of the first image region or the second image region to contrast with regional image data of another determined image region.

2. The method of claim 1, further comprising:
capturing a plurality of image frames, wherein the image frames are displayed by the external display device at a first frequency, wherein the first group of boundary markers is displayed by the display device at a second frequency, and wherein the first frequency is greater than the second frequency.

3. The method of claim 1, wherein detecting the first group of boundary markers comprises:
identifying a first boundary marker in a first image frame; and
identifying a second boundary marker in a second image frame, and wherein modifying the regional image data comprises:
generating, based on a plurality of image frames, a watermarked image including the plurality of boundary markers.

4. The method of claim 1, further comprising:
determining that each boundary marker of the first group of boundary markers is located along a peripheral edge of the detected image; and
in response to that determination, determining that an entirety of the detected image is within the first group of boundary markers.

5. The method of claim 1, wherein the first group of boundary markers is a coded pattern including encoded information, the encoded information including at least one of external display device dimensions, boundary marker location on the external display device, and boundary location on the external display device, the method further comprising:
decoding the coded pattern; and
determining, based on the decoded pattern, a location of the first image region in the detected image.

6. The method of claim 1,
wherein regional image data associated with the second image region includes regional image data for a portion of the detected image located exterior to the first image region circumscribed by the first group of boundary markers.

7. The method of claim 1, further comprising:
detecting, by the electronic device, a second group of boundary markers displayed by the external display device;
in response to detecting the second group of boundary markers, determining a third image region being circumscribed by the second group of boundary markers; and
modifying regional image data associated with the third image region to contrast with regional image data associated with the first image region and the second image region.

8. The method of claim 1, wherein modifying regional image data includes decreasing view-ability of the regional image data associated with a respective determined image region.

9. The method of claim 8, wherein decreasing the view-ability of the regional image data includes applying a blurring effect for providing a bokeh effect in the detected image.

10. The method of claim 1, wherein modifying regional image data includes increasing view-ability of the regional image data associated with a respective determined image region.

11. An electronic device comprising:
a camera;
a memory device; and
a processor coupled to the camera and the memory device, the processor being configured to:
generate image data associated with a detected image using the camera;
detect a first group of boundary markers displayed by an external display device, the first group of boundary markers being periodically displayed to be undetectable by a human eye that is viewing the external display device;
in response to detecting the first group of boundary markers, determine image regions associated with the generated image data including a first image region circumscribed by the first group of boundary markers and a second image region being distinct from the first image region; and
modify regional image data associated with at least one of the first image region or the second image region to contrast with regional image data of another determined image region.

12. The electronic device of claim 11, wherein the processor is further configured to:
capture a plurality of image frames, wherein the image frames are displayed by the external display device at a first frequency, wherein the first group of boundary markers is displayed by the display device at a second frequency, and wherein the first frequency is greater than the second frequency.

13. The electronic device of claim 11, wherein detect the first group of boundary markers, the processor is configured to:
identify a first boundary marker in a first image frame; and
identify a second boundary marker in a second image frame,
and wherein modify the regional image data, the processor is configured to:
generate, based on a plurality of image frames, a watermarked image including the plurality of boundary markers.

14. The electronic device of claim 11, wherein the processor is further configured to:
determine that each boundary marker of the first group of boundary markers is located along a peripheral edge of the detected image; and
in response to that determination, determine that an entirety of the detected image is within the first group of boundary markers.

15. The electronic device of claim 11, wherein the first group of boundary markers is a coded pattern including encoded information, the encoded information including at least one of external display device dimensions, boundary marker location on the external display device, and boundary location on the external display device, the processor is further configured to:
decode the coded pattern; and
determine, based on the decoded pattern, a location of the first image region in the detected image.

16. The electronic device of claim 11,
wherein regional image data associated with the second image region includes regional image data for a portion of the detected image located exterior to the first image region circumscribed by the first group of boundary markers.

17. A non-transitory computer-readable storage medium comprising processor-executable instructions which, when executed by a processor of an electronic device, causes the electronic device to:
generate image data associated with a detected image using the electronic device;
detect a first group of boundary markers displayed by an external display device, the first group of boundary markers is-being periodically displayed to be undetectable by a human eye that is viewing the external display device;
in response to detecting the first group of boundary markers, determine image regions associated with the generated image data including a first image region circumscribed by the first group of boundary markers and a second image region being distinct from the first image region; and
modify regional image data associated with at least one of the first image region or the second image region to contrast with regional image data of another determined image region.

* * * * *